Aug. 5, 1969  R. G. BRYER  3,459,940

PORTABLE ELECTROSCOPE TYPE DOSIMETER

Filed Nov. 30, 1965

INVENTOR
ROBERT GEORGE BRYER

BY Hame and Nydick

ATTORNEY

United States Patent Office 3,459,940
Patented Aug. 5, 1969

3,459,940
PORTABLE ELECTROSCOPE TYPE DOSIMETER
Robert George Bryer, Ashtead, Surrey, England, assignor to R. A. Stephen & Company, Limited
Filed Nov. 30, 1965, Ser. No. 526,919
Claims priority, application Great Britain, Dec. 1, 1964, 48,867/64
Int. Cl. G01t 1/16
U.S. Cl. 250—83.3                              11 Claims

ABSTRACT OF THE DISCLOSURE

There is disclosed a portable dosimeter of the electroscope type in which an electroscope having a movable member responsive to an electric charge, a translucent member bearing a graticule and a lense system imaging the movable member on the graticule are disposed in optically aligned relationship in a sealed tubular member. An eyepiece for viewing the image is exchangeably insertable into the end of the tubular member adjacent to the translucent member therein so as to engage wall surfaces of the tubular member in sealing engagement. Locating means including mating surfaces are provided for limiting the depth of insertion of the eyepiece into the tubular member to an axial portion in which the eyepiece is focused upon the image of the movable member. Due to the exchangeable mounting of the eyepiece, the same eyepiece can be used for reading any number of dosimeters. As the eyepiece is an expensive component of a dosimeter, the possibility of using the same eyepiece for a plurality of dosimeters represents a considerable saving.

---

Figure 1:
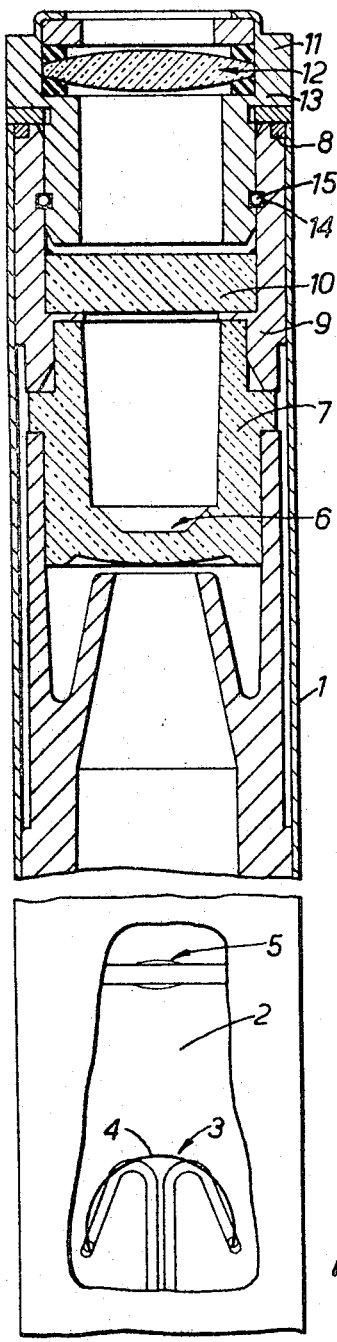

This invention relates to an improved dosimeter of the electroscope type, that is of the type in which a container filled with an ionisable gas contains an electroscope arranged so that the position of its moving member may be accurately observed.

Known dosimeters of this type usually comprise a cylindrical casing forming an ionisation chamber, within which is disposed an electroscope of which the moving member is constituted by a quartz fibre. An optical image of the quartz fibre is projected by means of a small lens upon a transparent member provided with a graticule which yields a measure of the deflection of the fibre. In view of the small size of the device as a whole the graticule is usually microscopically small and it is therefore necessary to provide magnifying optical means in order to allow an operator to view the graticule and thus determine the deflection of the electroscope. The lense used for this purpose commonly forms one sealing member for the assembly.

It has been found that disadvantages may attach to the ease with which the reading of such a device may be taken by anyone, including those unqualified correctly to interpret the result, and moreover the provision of the viewing lense necessarily adds to the cost of the device.

It would of course be theoretically possible to dispense with all optical components in a dosimeter of this kind and to use an appropriate external optical system to image the moving member of the electroscope on a graticule. However such an arrangement would introduce inaccuracy in reading owing to the differences in the geometrical relations of member and graticule resulting from inevitable positional tolerances necessary in the manufacturing operations involved and to allow the external optical system to be assembled to or removed from the dosimeter body.

The present invention broadly provides a dosimeter comprising as components of a permanent assembly an electroscope including a moving member and a graticule upon which an image of said member is projected by an optical system; said assembly including a body member which provides a first fiducial surface defining an axis perpendicular to said graticule and a second fiducial surface defining a plane perpendicular to said axis.

To read the deflection of the electroscope of a dosimeter according to the invention, the dosimeter is assembled together with a further device capable of aligned engagement with said assembly and abutment against said fiducial surface, which includes an optical system whereby said graticule may be viewed when said device is assembled to the dosimeter in engagement with the fiducial surface. Preferably the graticule itself is contained within an hermetically sealed casing of the assembly. Means may be provided for securing the optical device to the dosimeter in either a temporary or a permanent manner, as is best suited to the particular application for which a dosimeter is to be used.

In one embodiment of the invention the fiducial surface is constituted by the end surface of a generally cylindrical casing for the dosimeter assembly, whereas in another embodiment of the invention a fiducial surface is formed upon a member secured externally to that casing.

Figure 2:
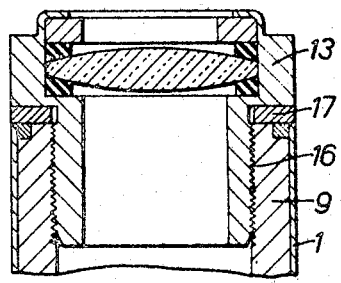
Figure 3:
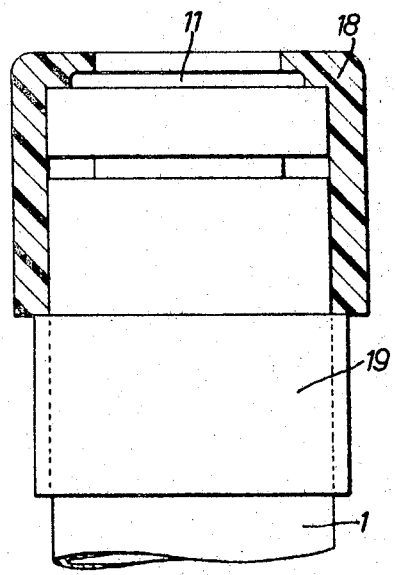

The invention will best be understood from the following description taken in conjunction with the accompanying drawing comprising FIGURES 1 to 3 in which:

FIGURE 1 is a partially sectional elevation of part of a dosimeter in accordance with the present invention, FIGURE 2 is a partially sectional elevation of an alternative construction of dosimeter according to the invention, and FIGURE 3 is a partly sectional partial view of another embodiment of dosimeter according to the invention.

The dosimeter shown in FIGURE 1 comprises a generally cylindrical casing 1 within which is an ionisation chamber 2 containing an electroscope 3, of which the moving element is a metallised quartz fibre 4. The arrangements necessary for charging the electroscope and for associating an appropriate capacitance therewith may be conventional, and as they form no part of the present invention such arrangements will not be further described. A small lens 5, conveniently constituted by a lenticular enlargement at the centre of a laminar transparent member though it may be a conventional glass lens, projects an image of movable fibre 4 of the electroscope on to a graticule 6 marked on a planar surface of a light-transmissive member 7 suitably distant from the lens. Above member 7 and soldered at 8 to tubular casing 1 is a tubular member 9 having a bore of which the inner end is sealed by a glass window 10. This window may be sealed in position by providing its edge with a fired-on silver coating and soldering this silver coating to member 9. The cylindrical wall of the recess formed in member 9 above window 10 forms a first fiducial surface defining an axis perpendicular to graticule 6.

Graticule 6 is viewed by means of an eyepiece 11 which in accordance with the present invention is separable from the dosimeter proper. The eyepiece, includes a single lens 12 held in a generally cylindrical body member 13 which slides telescopically into the bore of member 9 so that the outer surface of the eyepiece body constitutes a third fiducial surface matingly engaging the first fiducial surface presented by the recess wall. The eyepiece is axially located with respect to the graticule as described below.

A single such eyepiece may be used to read any number of dosimeters. To this end second and fourth fiducial surfaces formed on the dosimeter and on the eyepiece respectively are used to ensure the correct axial positioning for proper viewing. In the present embodiment grooves 14 are formed in eyepiece body 13 and in dosimeter body member 9, within which may be placed a spring clip ensuring that when the eyepiece is inserted in the dosimeter the two parts adopt predetermined axial positions relative to on another such that lens 12 forms a viewable virtual image of graticule 6. The grooves for spring clip 15 may be formed either so that registration is effected without preventing the ready removal of the eyepiece from the dosimeter, or so that the eyepiece, once inserted in the dosimeter, cannot be inadvertently removed.

In one alternative embodiment of the invention, which is illustrated by FIGURE 2, the eyepiece body 13 is externally screw-threaded so that it may be screwed into a mating screw thread formed within the cylindrical recess in member 9, as indicated at 16. The image-forming axial position of the eyepiece with respect to dosimeter graticule 6 is determined by second and fourth fiducial surfaces perpendicular to the axis of the screw thread, which engage a washer 17 provided between the eyepiece and the dosimeter body.

In another embodiment of the invention an eyepiece 11, again containing a single lens, is provided with an encompassing generally tubular cap 18 of plastics material which extends downwards over casting 1 of the dosimeter to engage a surface of a member 19 resiliently engaging casing 1 and secured thereto against axial movement at a position such as to ensure the correct optical position of eyepiece 11 for producing a viewable virtual image of the graticule.

The invention is not of necessity limited to dosimeters of the type described in relation to the drawings, for it will be appreciated by those skilled in the art that it may equally well be embodied in dosimeters using other forms of ionisation chamber and associated arrangements.

I claim:

1. A portable dosimeter comprising in combination:
   an electroscope including a member movable in response to an electric charge applied to the movable member;
   a translucent member bearing a graticule on one of its sides;
   a lense means optically interposed between said electroscope and said translucent member for imaging said movable member upon said graticule;
   a tubular member; said electroscope, said translucent member and said lens means being disposed in said tubular member in optically coacting aligned relationship;
   an eyepiece detachably insertable into the end of the tubular member adjacent to said translucent member for viewing the image of the movable member as appearing on said graticule, said eyepiece and the respective end of the tubular member having fiducial surfaces disposed parallel to the axis of the tubular member and in mating engagement with each other; and
   locating means on the eyepiece and the tubular member releasably engageable with each other for retaining the eyepiece in a predetermined axial position of insertion with reference to the tubular member.

2. The dosimeter according to claim 1 and further comprising a second translucent member interposed between said first translucent member and the end of the tubular member in which the eyepiece is received, said second translucent member being sealed to the surrounding wall portion of the tubular member.

3. The dosimeter according to claim 1 wherein said tubular member is cylindrical and the eyepiece has a depending cylindrical sleeve portion receivable in the respective end of the tubular member coaxially therewith, an inner wall portion of the tubular member at said end thereof constituting one fiducial surface and an outer wall portion of said sleeve portion constituting a second fiducial surface in mating engagement with said one fiducial surface.

4. The dosimeter according to claim 1 wherein said tubular member is cylindrical and the eyepiece has a depending cylindrical sleeve portion receivable in the respective end of the tubular member coaxially therewith, an inner wall portion of the tubular member at said end thereof and an outer wall portion of said sleeve portion being internally and externally threaded respectively for threading engagement with each other, the threads on said walls defining first and second fiducial surfaces in mating engagement with each other.

5. The dosimeter according to claim 1 wherein said locating means comprises a cylindrical sleeve portion extending from the eyepiece and receivable in the tubular member coaxially therewith, said sleeve portion having a circumferential groove in its outer wall, and said tubular member being a cylindrical member and having a cylindrical groove in its inner wall; and wherein an annular member is fitted into either groove radially yielding therein and engageable with the other groove, said grooves being in radial alignment when the eyepiece is placed in said predetermined axial position in the tubular member.

6. The dosimeter according to claim 1 wherein said tubular member has at its end portion for receiving the eyepiece a planar end face transverse of the axis of the tubular member and said eyepiece has on its side facing the graticule a planar surface, said planar end face and said planar surface constituting a first and second fiducial surface respectively, said fiducial surfaces abutting against each other when the eyepiece is in said predetermined axial position within the tubular member thereby locating the eyepiece.

7. The dosimeter according to claim 1 wherein said locating means comprises a cap having a viewing opening in its base wall, said cap being fittable upon the eyepiece, the side wall of the cap overlying the side wall of the eyepiece and part of the wall of the tubular member when the cap is fitted upon the eyepiece thereby locating the eyepiece in said predetermined axial position with reference to the tubular member.

8. The dosimeter according to claim 7 wherein a sleeve is fitted upon the tubular member lengthwise adjustable with reference thereto but restrained in a selected axial position, the rim of the cap being engageable with the respective rim of said sleeve thereby locating the axial position of the eyepiece with reference to the tubular member.

9. In a dosimeter comprising an electroscope including a member movable in response to a varying electrical charge thereon; a translucent member; a graticule on said translucent member; an optical system forming an image of said movable member on said graticule; and a hollow body member forming a sealed chamber containing said electroscope, said graticule and said optical system; the improvement which comprises providing said body member with a first fiducial surface symmetrical about an axis perpendicular to said graticule and a second fiducial surface perpendicular to said axis, said second fiducial surface being predeterminedly axially spaced from said graticule, whereby a viewing device having fiducial surfaces mateable with those of said first and second fiducial surfaces of said body member and fixedly related to a lens means engaged with said dosimeter with said fiducial surfaces matingly engaged provides viewable virtual images of said movable electroscope member and said graticule.

10. Radiation monitoring apparatus comprising in separable combination:
   electroscope means including an electroscope having a movable member; a translucent planar graticule; a first optical system projecting an image of said electroscope member on said graticule; and a hollow body member containing said electroscope, said graticule and said first optical system, said first body member having a first fiducial surface symmetrical about an axis perpendicular to the plane of said graticule and a second fiducial surface lying in a plane perpendicular to said axis and defining a position on said axis predeterminedly related to said graticule; and viewing means including a second body member, lens means having an optical axis secured in said second body member, a third fiducial surface on said second body member mateable with said first fiducial surface of said first body member thereby to align said axis and said optical axis and predeterminedly spaced with respect to said lens means and a fourth fiducial surface on said second body member mateable with said second fiducial surface of said first body member to produce a predetermined axial position of said lens means in relation to said graticule, whereby said lens means produces viewable virtual images of said graticule and of said electroscope member.

11. Radiation monitoring apparatus comprising the separable combination of:

electroscope means including a sealed chamber, said chamber containing a chargeable electrostatically movable member, a planar graticule and a first optical system imaging said member on said graticule; a first fiducial surface defining on said chamber symmetrical about an axis perpendicular to said graticule plane; a second fiducial surface on said chamber perpendicular to said axis and intersecting said axis at a position predeterminedly spaced from said graticule plane;

and electroscope viewer means including a body member containing lens means having an optical axis; a third fiducial surface on said body member engageable with said first fiducial surface to align said lens means with said axis and a fourth fiducial surface on said body member predeterminedly axially spaced from said lens means and engageable with said second fiducial surface predeterminedly to position said lens means on said axis with respect to said graticule whereby said lens means forms a viewable virtual image of said graticule.

References Cited

UNITED STATES PATENTS

| | | | |
|---|---|---|---|
| 2,446,365 | 8/1948 | Enter | 350—252 |
| 2,504,255 | 4/1950 | Lanauze | 350—318 X |
| 2,638,553 | 5/1953 | Landsverk et al. | 250—83.3 X |
| 2,942,539 | 6/1960 | Geddes. | |
| 3,110,808 | 11/1963 | Fauser et al. | 250—83.3 |

ARCHIE R. BORCHELT, Primary Examiner

A. B. CROFT, Assistant Examiner

U.S. Cl. X.R.

350—10, 252